US007657289B1

(12) United States Patent
Levy et al.

(10) Patent No.: US 7,657,289 B1

(45) Date of Patent: Feb. 2, 2010

(54) SYNTHESIZED VOICE PRODUCTION

(76) Inventors: Mark Levy, 19 Chenango St., Binghamton, NY (US) 13901; Jack Dann, P.O. Box 101, Foster (AU) VIC 3960

( * ) Notice: Subject to any disclaimer, the term of this patent is extended or adjusted under 35 U.S.C. 154(b) by 792 days.

(21) Appl. No.: 11/003,669

(22) Filed: Dec. 3, 2004

(51) Int. Cl.
*H04B 1/38* (2006.01)

(52) U.S. Cl. ................. 455/563; 455/412.1; 455/412.2; 704/270.1; 704/275

(58) Field of Classification Search ................. 455/563, 455/412.1, 578, 412.2; 704/270.1, 275
See application file for complete search history.

(56) References Cited

U.S. PATENT DOCUMENTS 5,715,370 A * 2/1998 Luther et al. ............. 704/270.1
2002/0055844 A1* 5/2002 L'Esperance et al. ....... 704/260
2002/0099553 A1* 7/2002 Brittan et al. ............ 704/270.1
2003/0125958 A1* 7/2003 Alpdemir et al. ............ 704/275
2004/0049390 A1* 3/2004 Brittan et al. ............ 704/270.1
2004/0224710 A1* 11/2004 Koskelainen et al. ......... 455/518

* cited by examiner

*Primary Examiner*—Sanh D Phu
(74) *Attorney, Agent, or Firm*—Mark Levy; Hinman, Howard & Kattell

(57) ABSTRACT

A communications system for receiving and transmitting information signals. An electronic processor is adapted to receive information signals from at least one source, operatively connected to the electronic processor. An audible signal generator generates sounds related to the information signals. The source of information signals can be a telephone, cell phone, microphone, PDA, computer, printed document, Internet web site, e-mail or immediate message. The processor has a mechanism for generating an audible signal reminiscent of a celebrity voice, a cartoon voice, or a computer-generated sound.

14 Claims, 4 Drawing Sheets

SYNTHESIZED VOICE PRODUCTION

FIELD OF THE INVENTION

The invention relates to voice synthesis and, more particularly, to a system for generating synthetic voices and sounds based on communications provided by individuals and organizations at remote locations.

BACKGROUND OF THE INVENTION

As electronic devices become more sophisticated, primitive signals and indicators are being replaced by audible signals that provide more information. This trend is likely to continue because consumers and users of equipment will demand more intelligent products and the manufacturing cost of audible signal generators will decrease.

Certain products and appliances are equipped with simple visible lights (e.g., incandescent lamps, LEDs, etc.) or audible devices (e.g., beepers, bells, etc.). In the case of automobiles, for example, an icon sometimes referred to as an idiot light, may illuminate when oil pressure drops below a predetermined level. This informs the vehicle driver to add oil to the engine. However, a driver may travel many miles before noticing such an illuminated icon on the dashboard. Similarly, when the door of a vehicle is opened and headlights are on, a bell or buzzer may sound. Unfortunately, the same bell or buzzer may be activated when another condition occurs, such as an unfastened seatbelt or another passenger door ajar. Failure to distinguish such a warning can be annoying at best and dangerous at worst.

Appliances with visual or aural indicators need not be vehicles. Most every electronic device from coffee pots and toasters to power generators could benefit from informative warnings and messages. Instead of an idiot light indicating an engine is overheating, for example, an intelligent voice synthesizer could articulate the temperature.

Voice synthesis has been used for many years to convey audible messages. From early computerized, mechanical "voices" to sounds more closely associated with humans, such messages have been used generally with relatively expensive products. Recently, however, as computer chips have become more affordable, human-sounding audible signal generators have been found in greeting cards and children's toys. It is therefore not impossible to imagine their use in the widest variety of electronic devices.

U.S. Pat. No. 6,754,630, issued to Das et al. on Jun. 22, 2004 for SYNTHESIS OF SPEECH FROM PITCH PROTOTYPE WAVEFORMS BY TIME-SYNCHRONOUS WAVEFORM INTERPOLATION discloses a method of synthesizing voiced speech from pitch prototype waveforms by time-synchronous waveform interpolation (TSWI). One or more pitch prototypes is extracted from a speech signal or a residue signal. The extraction process is performed in such a way that the prototype has minimum energy at the boundary. Each prototype is circularly shifted so as to be time-synchronous with the original signal. A linear phase shift is applied to each extracted prototype relative to the previously extracted prototype so as to maximize the cross-correlation between successive extracted prototypes. A two-dimensional prototype-evolving surface is constructed by unsampling the prototypes to every sample point. The two-dimensional prototype-evolving surface is re-sampled to generate a one-dimensional, synthesized signal frame with sample points defined by piecewise continuous cubic phase contour functions computed from the pitch lags and the phase shifts added to the extracted prototypes. A pre-selection filter may be applied to determine whether to abandon the TSWI technique in favor of another algorithm for the current frame. A post-selection performance measure may be obtained and compared with a predetermined threshold to determine whether the TSWI algorithm is performing adequately.

U.S. Pat. No. 6,708,153, issued to Brittan et al. on Mar. 16, 2004 for VOICE SITE PERSONALITY SETTING discloses a method of setting the voice personality of a voice service site. A user browsing a voice web visits a voice site where the voice output of the site is presented using a set of voice personality characterisers with which the user is particularly comfortable. The user, in subsequently transferring to another voice service site, opts to have the voice personality that was embodied in the set of voice personality characterisers used by the site being left, transfer with the user to the new site. This transfer will typically be subject to permissions set by both the site being left and the site about to be visited.

A voice recognition facility is provided with a communication system allowing a human voice to be provided to the system via a microphone in U.S. Pat. No. 6,263,202, issued to Kato et al. on Jul. 17, 2001 for COMMUNICATION SYSTEM AND WIRELESS COMMUNICATION TERMINAL DEVICE USED THEREIN. A communication system is disclosed whereby desired information can be transmitted in accordance with conditions and the application. The communication system includes a PHS terminal and a provider system that is capable of information communication with this terminal. The PHS terminal has a voice recognition section that receives voice from a microphone and recognizes the received voice signal, an input device that selects the output form of the voice signal, a conversion section that converts the recognized voice signal with the selected output form, and a transceiver that transmits the converted voice signal to the provider equipment; the converted voice signal is further transferred from the provider system to another destination wireless communication terminal device. This output form includes for example "dialect," "intonation/imitated voice of a celebrity etc." or "modulation." Conversion filters convert the voice signal in accordance with these.

While the aforementioned patents disclose methods of receiving audible information and generating a synthesized signal responsive thereto, they fall short of describing a truly universal system that can be used by individuals and organizations at remote locations.

It would be advantageous to provide a communications system that could be accessed by individuals from remote locations.

It would also be advantageous to provide a plurality of information signal facilities (e.g., voice recognition, document scanning, etc.) to convey such information signals.

It would also be advantageous to provide a system that could synthesize voices equivalent to, or reminiscent of human voices, celebrity voices, cartoon voices, computer-generated voices and the like.

It would further be advantageous to provide electronic devices and appliances with facilities to receive information signals and to generate audible signals related thereto.

It would also be advantageous to provide a method of converting a human voice or document to an audible signal reminiscent or imitative of a celebrity's voice or a computer-generated voice.

It would further be advantageous to provide a method for an individual to program his or her electronic device from a remote location.

SUMMARY OF THE INVENTION

In accordance with the present invention, there is provided a communications system for receiving and transmitting information signals. An electronic processor is adapted to receive information signals from at least one source. At least one source of information signals is operatively connected to the electronic processor. An audible signal generator generates sounds related to the information signals. The source of information signals can be a telephone, cell phone, PDA, computer, printed document, Internet web site, email or immediate message. The processor has a mechanism for generating an audible signal reminiscent of a celebrity voice, a cartoon voice, or a computer-generated voice.

BRIEF DESCRIPTION OF THE DRAWINGS

A complete understanding of the present invention may be obtained by reference to the accompanying drawings, in which.

For purposes of clarity and brevity, like elements and components will bear the same designations and numbering throughout the FIGURES.

DESCRIPTION OF THE PREFERRED EMBODIMENT

Generally speaking, the invention features a system and method for processing audible or written information and generating a stylized sound therefrom. The stylized sound may be a vocal output reminiscent or imitative of a celebrity's voice, a cartoon voice, or a computer-generated voice. A user can call via telephone or cell phone, or may otherwise provide a vocal input to the system of the invention. In addition, the user can email a message, or can mail a written document which is recognized, received or scanned. Regardless of whether an audio signal or a document is provided as input, that input is processed and converted to a vocal audio output having tone, pitch, timbre, cadence, emphasis and emotion similar to those of the voice of a celebrity or similar stylized sound. The system can be disposed in electronic devices or appliances to provide audible warnings, instructions or status conditions to the user.

Figure 1:
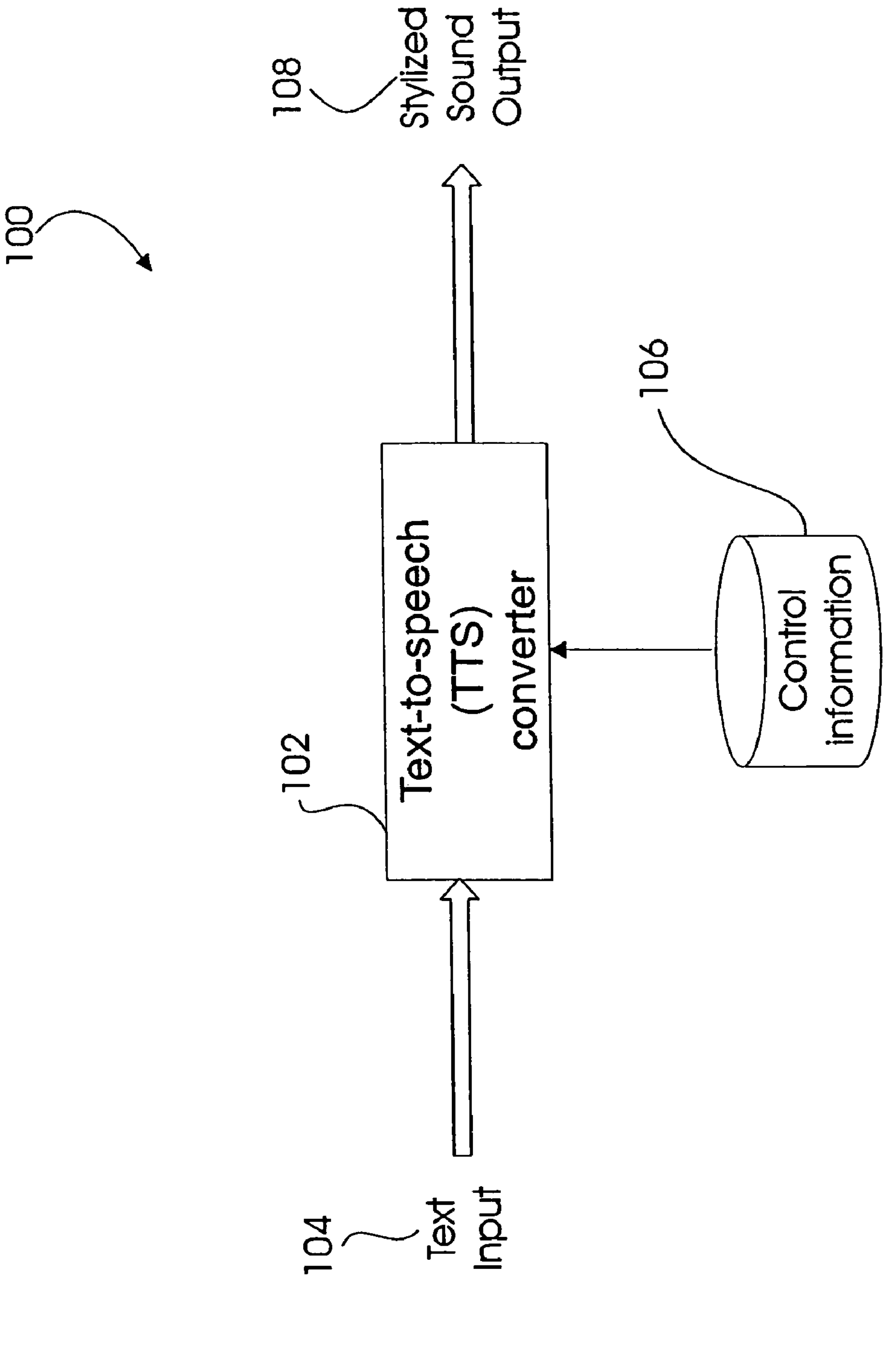
FIG. 1 is a block diagram of the communications system in accordance with the present invention.

Referring first to FIG. 1, there is shown a simplified block diagram of a first embodiment of the system of the invention, generally at reference numeral 100. A text-to-speech (TTS) converter 102 is supplied with a textual input 104 and, under the control of control information 106 provides a stylized audio (i.e., speech) output 108. TTS conversion systems have been available for some time, some provided on stand-alone microchips, not shown. Such microchips have typically provided a small number of program-selectable output voices, for example, a male or female voice. Text supplied to such TTS conversion devices results in a spoken vocal audio output whose quality varies from comical to acceptable to declarative depending primarily upon the age and cost of the TTS converter.

Another way the TTS conversion is accomplished is using software running in a general-purpose microprocessor or computer. The sophistication again depends primarily upon the sophistication of the TTS algorithm(s) and the amount of processing resource available to execute it. If, for example, the inventive system 100 is intended to be used with a commercial telephone system incorporating voice mail and other telephonic services for a great number of subscribers, speech processor 102 will probably be implemented as one or more mainframe computer systems, not shown.

Sophisticated TTS algorithms, whether embodied in stand-alone microchips or executed on general-purpose microprocessors, typically allow great control of the overall "sound" of the vocal output. Tone, pitch, timbre, cadence, emphasis, and emotion are some of the characteristics used to describe the quality of an artificially generated vocal output. These and other vocal characteristics may be controlled by providing a set of control information 106 to the TTS converter 102. By customizing the control information 106, the vocal output of TTS 102 may be customized to produce the desired voice, be it a celebrity, cartoon, or machine-like voice. Das et al., discussed hereinabove, provide one such method of controlling voice synthesis based on pitch prototype waveforms using a time-synchronous waveform interpolation method. The motivation for the Das et al. system is to provide authentic reproductions of speech compressed for the purpose of minimizing transmission bandwidth in a communications system.

Other control strategies are known to those of skill in the art. Therefore, the method of the present invention is not considered limited to any particular control strategy but covers any and all methods for controlling the voice characteristics of a TTS or other speech synthesis apparatus.

Figure 2:
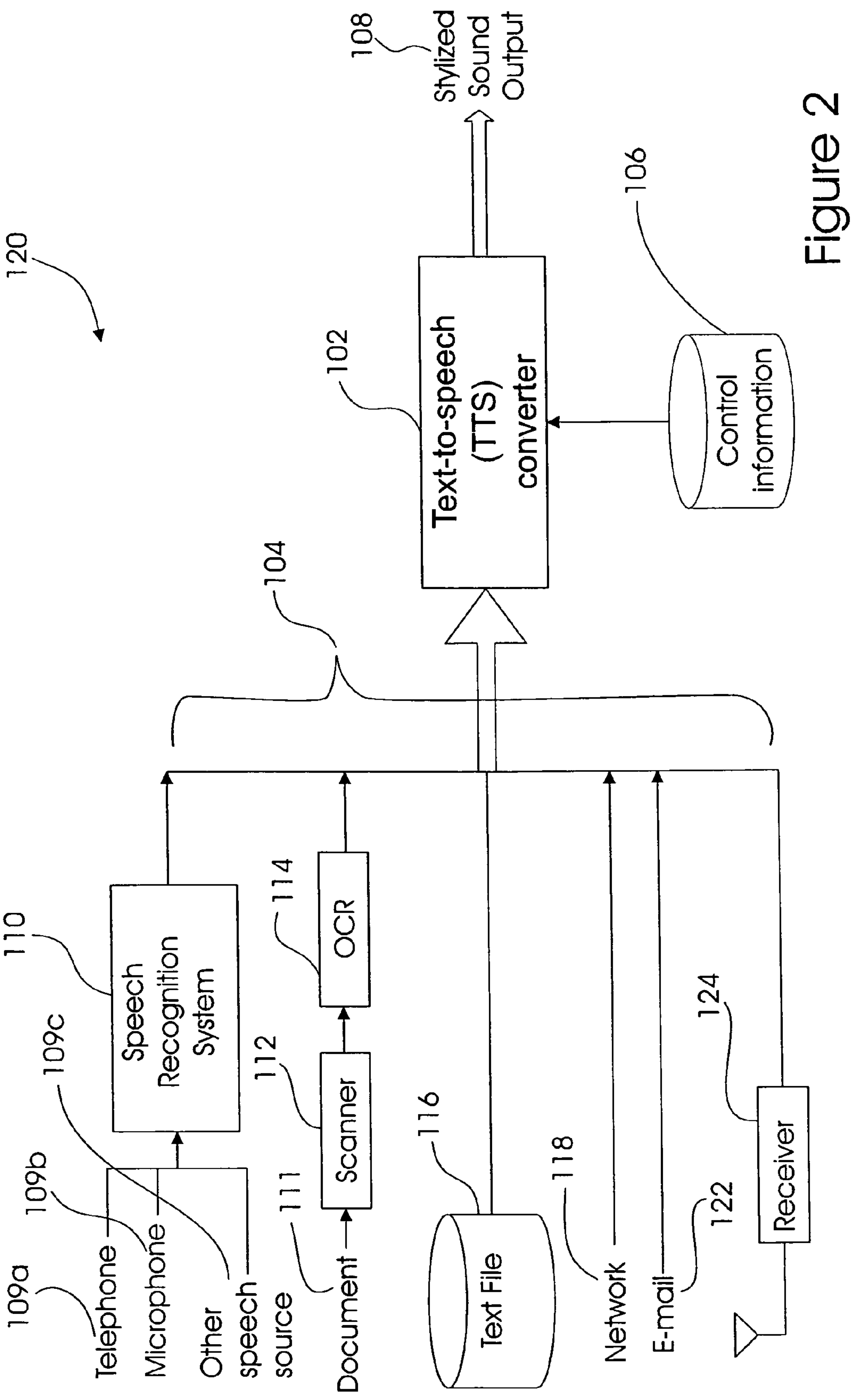
FIG. 2 is a block diagram of the processor shown in FIG. 1.

Referring now also to FIG. 2, there is shown a more complete block diagram of the system of the invention, generally at reference numeral 120. Text input to TTS converter 102 may be provided in a wide variety of ways. An audio signal may be provided via a telephone 109*a*, a directly connected microphone 109*b*, or from any other speech source 109*c* such as but not limited to a tape recorder. When an audio signal is supplied, it is necessary to process the speech through a speech recognition system 110. The output of speech recognition system 110 is text in the preferred embodiment, although other forms of output may be used.

Input may also be supplied from any typed, printed or other recognizable document 111. When a document 111 is supplied, it is generally scanned by scanner 112 and the scanned image is provided to an optical character recognition (OCR) system 114 for conversion to text.

A machine-readable text file 116 may also be used as input to TTS converter 102. A machine-readable file may also be supplied from a network connection 118 or in the form of e-mail 122. A wireless connection 124 may also be used to receive a machine-readable text file as input for TTS converter 102.

It will be recognized that machine-readable text files 116 may be obtained from or generated by a wide number of sources and/or devices. Typical sources for machine-readable text files 116 include but are not limited to: diskettes, hard drives, USB-connected storage devices, ZIP disks, CDs, DVDs, Braille document readers, punched cards, paper tape, magnetic tape, memory devices such as flash memory cards, etc., not shown.

Figure 3:
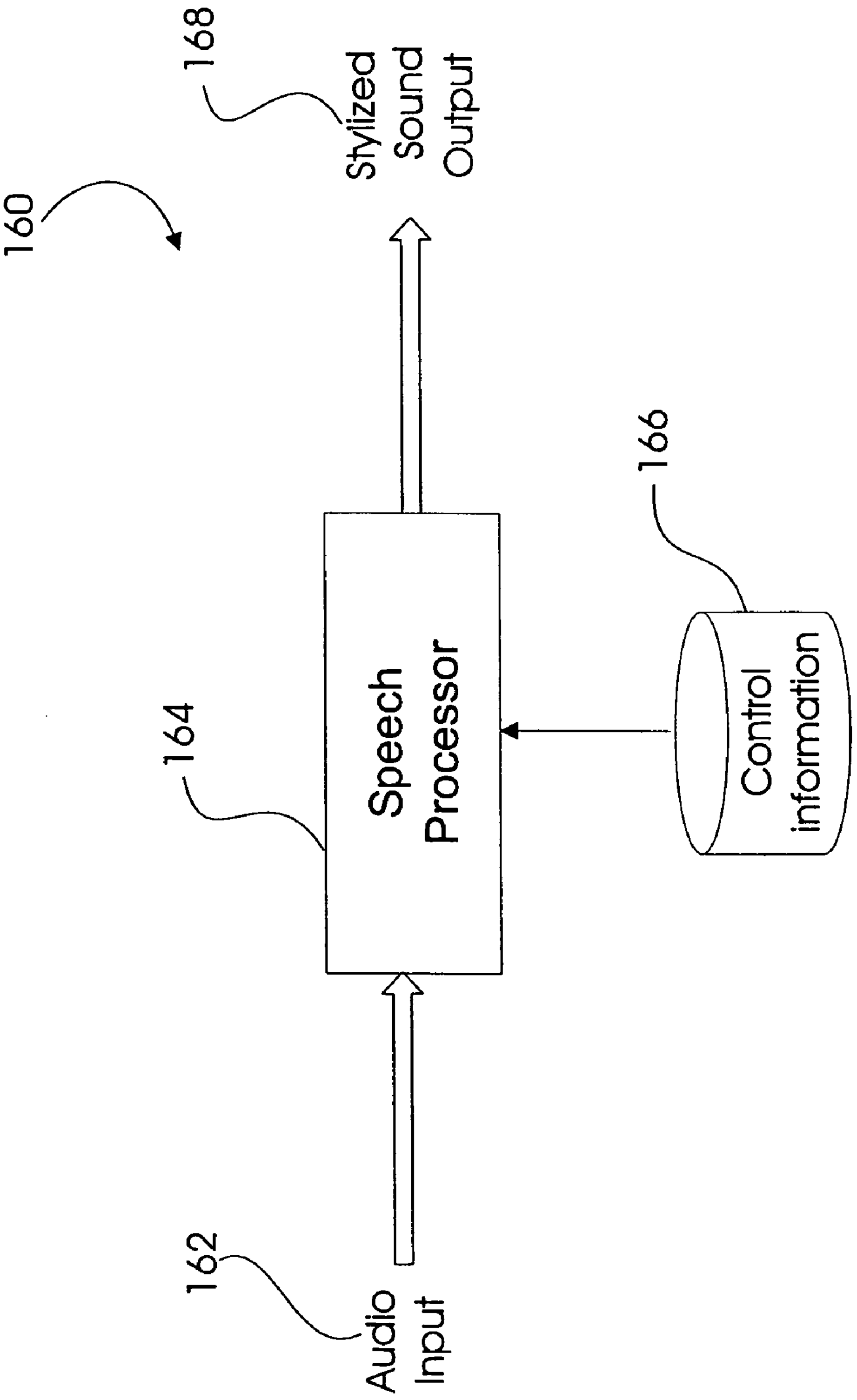
FIG. 3 is a block diagram of an alternate embodiment of the inventive system that permits audio input directly to a speech processor.

Referring now to FIG. 3, in other embodiments of the inventive system an audio input may be directly processed. In other words, the speech to text conversion performed by speech recognition system 104 is no longer required. Rather, an audio signal 162 is directly processed by the inventive system. FIG. 3 is a simplified block diagram of such a system, generally at reference numeral 160. Speech in audio form 162 is provided as input to speech processor 164 which, in accordance with control information 166, provides stylized sound output 168.

It will be recognized that the function of either speech processor 164 or TTS 102 may be implemented in many ways ranging from stand-alone microchips to main frame computers, the actual implementation of the functions of either forming no part of the instant invention. Rather the invention includes any implementation of the function of either speech processor 164 or TTS 102.

The stylized sound output 108 provided by either TTS 102 or speech processor 164 has many uses. Electronic or mechanical devices and appliances, which may be with or without interactivity with the user, can incorporate the inventive stylized sound output 108. Such devices and appliances include but are not limited to:

telephones (answering machines)

cellular phones (voice mail)

computers and peripherals vehicles (automobiles, trucks, boats, buses)

aircraft and spacecraft kitchen devices (dishwashers, microwave ovens, stoves, garbage disposals, toasters, refrigerators, freezers, can openers, mixers, blenders, juicers)

laundry appliances (washing machines, dryers)

household appliances (vacuum cleaners, ironing devices, clocks, radios, stereos, TVs, cameras, DVD players, VCRs)

outdoor equipment (lawn mowers, mulchers, tractors, trimmers)

robots and cybernetic devices commercial building equipment (HVAC units, elevators, compressors, lighting).

Typical warnings, instructions and status conditions include, but are not limited to:

Wake up

Hot

Milk is sour

Two minute warning

Open from top

Please leave a message

Seventy-one degrees

Laundry is finished

Fasten seat belt

Monday, October 25

For example, an alarm clock could be programmed to wake a sleeping user in the emulated voice of Marilyn Monroe, saying "Good morning, Mr. President." Alternatively, the user's toaster could warn him or her in Julia Child's emulated voice, "Now don't burn that toast!" On the other hand, the user's voice mail could announce the number of new messages in the emulated voice of James Dean. Similarly, Tellulah Bankhead's emulated voice could be used on a telephone answering machine to invite callers to leave a message for the user.

As can be appreciated from the foregoing description, the invention provides a convenient way in which an individual or organization can emulate a celebrity's voice or computer-generated sound from a remote location to provide warnings, greetings, instructions or status conditions from or of electronic devices and appliances.

In use, the function of either TTS 102 or speech processor 164 depends upon the control information 106, 166, respectively provided thereto. Emulation of a celebrity voice or generation of an original stylized sound both require the unique control information 106, 166 to provide the desired stylized sound output. This control information 106, 166 may be derived in a wide variety of ways.

Figure 4:
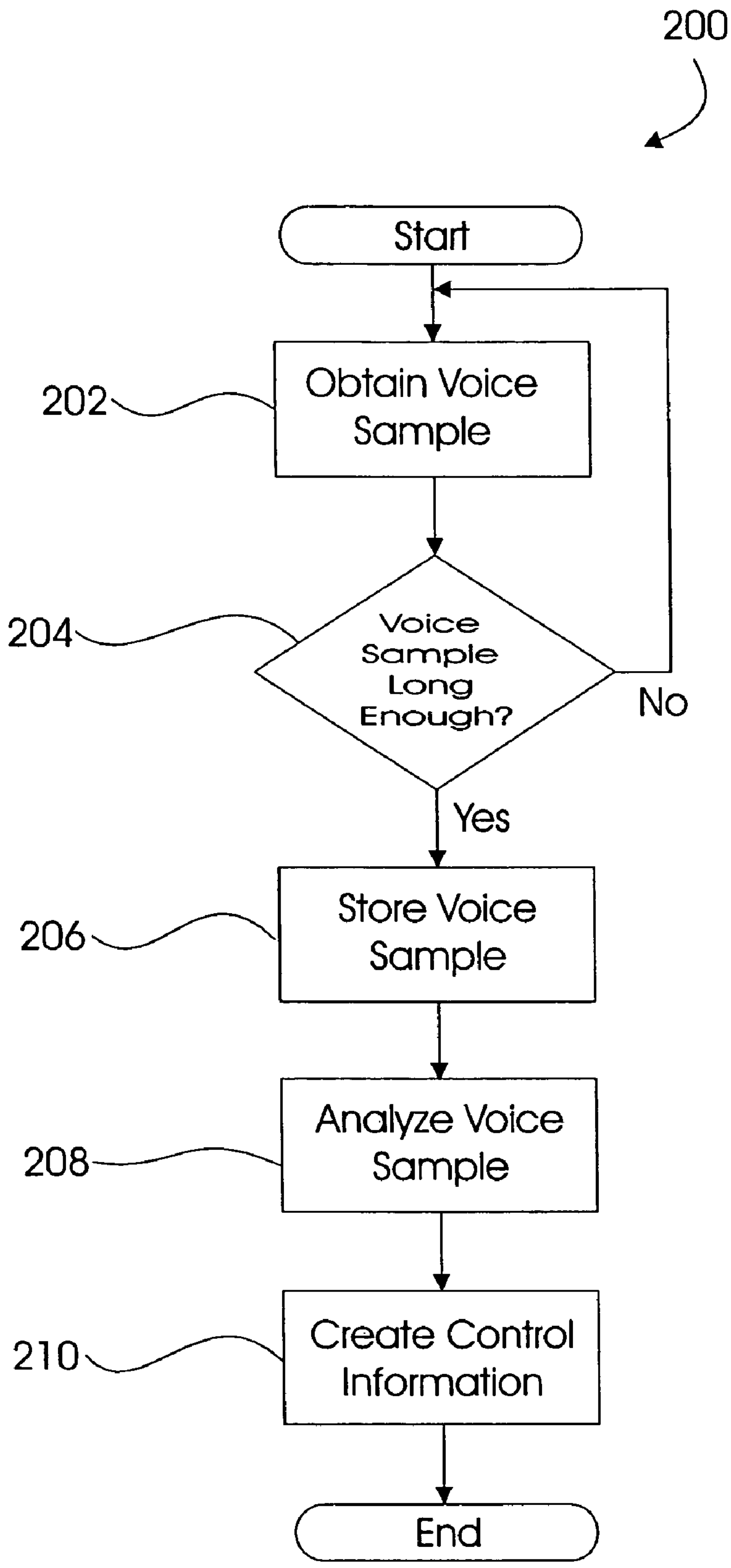
FIG. 4 is a flow chart depicting the process for a user to generate an audible message in the voice of a celebrity.

Referring now to FIG. 4, there is shown a flow chart of a method for creating control information corresponding to a desired voice, generally at reference numeral 200. First, the voice sample is obtained, step 202. The obtained voice sample must be sufficient for a computer analysis to be performed, step 204. Optionally, the voice sample may be stored, step 206. Next, analysis of the voice sample is performed, step 208. Finally, the necessary control information 106, 166 is created, step 210, based upon the analysis, step 208, and predetermined information regarding the specific requirements of a particular TTS 102 or voice processor 164. A plurality of celebrity or other voice or electronic sound samples may be stored in a suitable memory device, not shown.

A second way to generate control information signals 106, 166 is to manually create or to modify existing, similar control signals. This may be performed by a technician utilizing appropriate hardware and/or software. Totally original stylized sounds may be created or stylized voices similar to existing voices may be produced.

Once the necessary control information 106, 166 is created, modified, and/or refined, that control information may be utilized in commercial applications. For example, the necessary control information 106, 166 for a single stylized voice may be packaged on a read-only memory (ROM) for inclusion, along with the necessary TTS 102 or voice processor 164, in one of aforementioned appliances or devices.

For devices requiring a set of fixed messages, necessary text or other files may also be provided on a ROM device. It will be recognized that both control information 106, 166 and message text 104 could be packaged within the same ROM device.

For devices requiring changeable messages, dependent, for example, on detection of events by sensors presently existing or as yet unrealized cybernetic detectors, input text may be stored on a programmable read-only memory device (PROM) or other updateable storage device. The PROM can be updated by an end user or a service/support technician on an as-needed basis. Apparatus and methods for re-writing PROMs or the like are known to those of skill in the art. It will also be recognized in applications for which a large user base requires identical, periodic updates, that downloadable updates can be made available or new ROMs or PROMs may be shipped to the end user's site for installation by the end user. This process would be similar to users of postage meters who typically receive new ROMs or the like when postage rates change.

Control information 106, 166 could be provided in a library and distributed to potential end users on CD, DVD, or any other suitable media. The library, of course, could be made accessible for selective downloading via the Internet or other publicly or privately accessible network. Control information 106, 166 could be provided for a fee or could be made available without charge.

It is recognized that for certain (e.g., celebrity) voices a license might be required for use of that voice, if protected. An owner/manager of a library could manage any clearance required for using voices.

Since other modifications and changes varied to fit particular operating requirements and environments will be apparent to those skilled in the art, the invention is not considered limited to the example chosen for purposes or disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for providing control information for creating a stylized sound output, the steps comprising:

a) providing an electronic processor;

b) using said electronic processor to create control information compatible with means for producing a predetermined stylized sound output comprising a synthesized celebrity's voice from an input thereto, said producing a predetermined stylized sound comprising processing a voice sample of a prototype voice corresponding to said predetermined stylized sound such that said predetermined stylized sound substantially matches said voice prototype; and c) providing said control information to a user thereof;

whereby at least a portion of said control information is provided to a user thereof, and said user may create said predetermined stylized sound output from said input in accordance with said control information.

2. The method for providing control information for creating a stylized sound output as recited in claim 1, wherein means for producing a predetermined stylized sound output comprises at least one of the devices: a text-to-speech converter, and a voice processor.

3. The method for providing control information for creating a stylized sound output as recited in claim 1, wherein said input comprises at least one of: a text stream, and an audio signal.

4. The method for providing control information for creating a stylized sound output as recited in claim 1, wherein said creating step (b) further comprises modifying said control information so that said predetermined stylized sound varies from said prototype voice in at least one characteristic.

5. The method for providing control information for creating a stylized sound output as recited in claim 1, wherein at least a portion of said control information is written to a modular storage device.

6. The method for providing control information for creating a stylized sound output as recited in claim 5, wherein said modular storage device comprises at least one of: a ROM, a PROM, and another non-volatile memory.

7. The method for providing control information for creating a stylized sound output as recited in claim 1, wherein said control information compatible with means for producing a predetermined stylized sound output is collected with similar control information for producing at least one other stylized sound output.

8. The method for providing control information for creating a stylized sound output as recited in claim 1, wherein said at least a portion of said control information is provided on at least one of the media: diskette, CD, and DVD.

9. The method for providing control information for creating a stylized sound output as recited in claim 1, wherein at least a portion of said control information is provided on-line via a publicly accessible network.

10. The method for providing control information for creating a stylized sound output as recited in claim 1, wherein said control information is created from at least one source of information signals chosen from the group of: telephone, cell phone, PDA, computer, microphone, printed document, computer file, the Internet, e-mail, and immediate message.

11. The method for providing control information for creating a stylized sound output as recited in claim 1, wherein said output stylized predetermined sound is reminiscent of one chosen from the group: celebrity voice, cartoon voice, and computer-generated sound.

12. The method for providing control information for creating a stylized sound output as recited in claim 1, further comprising a consumer device having a speaker from which said stylized sound emanates.

13. The method for providing control information for creating a stylized sound output as recited in claim 12, wherein said consumer device is chosen from the group: appliances, electronic devices, telephones, cellular phones, computers and peripherals, vehicles, aircraft, kitchen devices, laundry appliances, household appliances, outdoor equipment and commercial building equipment.

14. The method for providing control information for creating a stylized sound output as recited in claim 4, wherein said control information is representative of at least one of the characteristics: tone, pitch, timbre, inflection, emotion, format, emphasis, and cadence of an emulated voice.

* * * * *